United States Patent
Sugiura et al.

(10) Patent No.: US 9,379,375 B2
(45) Date of Patent: Jun. 28, 2016

(54) LITHIUM SECONDARY BATTERY AND CATHODE OF THE LITHIUM SECONDARY BATTERY

(75) Inventors: Ryuta Sugiura, Nagoya (JP); Nobuyuki Kobayashi, Nagoya (JP); Tsutomu Nanataki, Toyoake (JP); Masaya Ugaji, Osaka (JP); Kaoru Nagata, Osaka (JP)

(73) Assignee: NGK Insulators, Ltd., Nagoya (JP)

( * ) Notice: Subject to any disclaimer, the term of this patent is extended or adjusted under 35 U.S.C. 154(b) by 785 days.

(21) Appl. No.: 13/166,087

(22) Filed: Jun. 22, 2011

(65) Prior Publication Data

US 2012/0009471 A1    Jan. 12, 2012

(30) Foreign Application Priority Data

Jun. 23, 2010   (JP) .................................. 2010-142441

(51) Int. Cl.
| | |
|---|---|
| H01M 4/485 | (2010.01) |
| H01M 4/583 | (2010.01) |
| H01M 4/64 | (2006.01) |
| H01M 4/04 | (2006.01) |
| H01M 4/131 | (2010.01) |
| H01M 4/505 | (2010.01) |
| H01M 4/525 | (2010.01) |

(Continued)

(52) U.S. Cl.
CPC .......... *H01M 4/0471* (2013.01); *H01M 4/0404* (2013.01); *H01M 4/131* (2013.01); *H01M 4/505* (2013.01); *H01M 4/525* (2013.01); *H01M 10/0525* (2013.01); *H01M 2004/021* (2013.01); *Y02E 60/122* (2013.01)

(58) Field of Classification Search
CPC . H01M 4/131; H01M 4/0471; H01M 4/0404; H01M 4/505; H01M 4/525; H01M 10/0525; H01M 2004/021; Y02E 60/122
USPC .............................................. 429/211, 218.1
See application file for complete search history.

(56) References Cited

U.S. PATENT DOCUMENTS

| | | | |
|---|---|---|---|
| 5,631,100 | A | 5/1997 | Yoshino et al. |
| 5,709,969 | A | 1/1998 | Yamahira |
| 2001/0019798 | A1 | 9/2001 | Kajiura et al. |

(Continued)

FOREIGN PATENT DOCUMENTS

| | | |
|---|---|---|
| CN | 1430795 A | 7/2003 |
| JP | 05-226004 A1 | 9/1993 |

(Continued)

OTHER PUBLICATIONS

U.S. Appl. No. 13/166,077, filed Jun. 22, 2011, Sugiura et al.

(Continued)

*Primary Examiner* — Sarah A Slifka
*Assistant Examiner* — Brent Thomas
(74) *Attorney, Agent, or Firm* — Burr & Brown, PLLC

(57) ABSTRACT

To provide a lithium secondary battery which has high capacity while maintaining excellent cycle characteristic. The lithium secondary battery cathode of the present invention includes a cathode collector formed of a conductive substance, and a cathode active material layer formed of a sintered lithium composite oxide sheet. The cathode active material layer is bonded to the cathode collector by the mediation of a conductive bonding layer. A characteristic feature of the present invention resides in that the cathode active material layer has a thickness of 30 μm or more, a voidage of 3 to 30%, and an open pore ratio of 70% or higher.

8 Claims, 9 Drawing Sheets

(51) Int. Cl.
*H01M 10/0525* (2010.01)
*H01M 4/02* (2006.01)

(56) References Cited

U.S. PATENT DOCUMENTS

| | | | |
|---|---|---|---|
| 2003/0170540 A1 | 9/2003 | Ohzuku et al. | |
| 2008/0193844 A1* | 8/2008 | Ohzuku et al. | 429/223 |
| 2009/0194734 A1* | 8/2009 | Arimoto | 252/182.1 |
| 2009/0202903 A1* | 8/2009 | Chiang et al. | 429/203 |
| 2009/0246636 A1 | 10/2009 | Chiang et al. | |
| 2010/0159325 A1* | 6/2010 | Sugiura et al. | 429/223 |

FOREIGN PATENT DOCUMENTS

| | | |
|---|---|---|
| JP | 08-180904 A1 | 7/1996 |
| JP | 2001-143687 A1 | 5/2001 |
| JP | 2002-042785 | 2/2002 |
| JP | 2003-132882 | 5/2003 |

OTHER PUBLICATIONS

Chinese Office Action, Chinese Application No. 201110184882.8, dated Aug. 4, 2014 (6 pages).

* cited by examiner

THICKNESS
10 μm

20 μm

30 μm

LITHIUM SECONDARY BATTERY AND CATHODE OF THE LITHIUM SECONDARY BATTERY

BACKGROUND OF THE INVENTION

1. Field of the Invention

The present invention relates to a cathode of a lithium secondary battery and to a lithium secondary battery having the cathode.

2. Description of the Related Art

The cathode active material layer of a lithium secondary battery (may be referred to as a "lithium ion secondary battery") is widely known to be formed through kneading a kneaded product of a lithium composite oxide (lithium transition metal oxide) powder with additives such as a binder and a conducting agent and molding the kneaded product. For example, Japanese Patent Application Laid-Open (kokai) No. Hei 5-226004 discloses such a technique. Hereinafter, such a configuration is referred to as a "powder-dispersion type cathode."

Since the powder-dispersion type cathode contains a large amount (e.g., about 10 wt. %) of a binder, which is not a capacity-enhancing ingredient, the relative amount of the lithium composite oxide serving as a cathode active material contained in the cathode is small. Therefore, the capacity and charge-discharge efficiency of such a powder-dispersion type cathode are not satisfactory and to be further improved.

To overcome this drawback, efforts have been made to improve the capacity and charge-discharge efficiency through forming the cathode or the cathode active material layer from a sintered lithium composite oxide sheet. For example, Japanese Patent Application Laid-Open (kokai) Nos. Hei 8-180904 and 2001-143687 disclose such a technique. According to this technique, the cathode or the cathode active material layer contains no binder. Therefore, the lithium composite oxide filling density increases, conceivably leading to high capacity and excellent charge-discharge efficiency.

In the case where the cathode or the cathode active material layer is formed from a sintered lithium composite oxide sheet, when the sintered sheet has a low lithium composite oxide filling ratio (i.e., high voidage), the effect of enhancing the performance of the aforementioned powder-dispersion type cathode; in particular, capacity-enhancing effect, is unsatisfactory. In fact, cathodes formed from a sintered lithium composite oxide sheet disclosed in Japanese Patent Application Laid-Open (kokai) Nos. Hei 8-180904 and 2001-143687 have a low filling ratio (a voidage of 15 to 60%), which is unsatisfactory in terms of capacity.

Meanwhile, when the sintered sheets has an excessively high lithium composite oxide filling ratio, high capacity is attained, but the cyclic characteristic (i.e., capacity retention performance after repetition of charge-discharge cycles) is known to be problematically impaired. The impairment in cyclic characteristic is caused also when the sintered sheet has a thickness of about 10 µm. Particularly when the sintered sheet has a thickness as large as 30 µm or more, the impairment is considerably severe.

In order to elucidate the cause for the impairment, sintered lithium composite oxide sheets tested in an experiment example where the cyclic characteristic had been impaired were previously observed under an electron microscope. Through observation, cracks were found to be generated in the sintered sheets. The cracks were generated at the grain boundary, where the boundary between regions which are adjacent to each other and have different crystal orientations (hereinafter, the cracks are referred to as "grain boundary cracks"). Furthermore, the sintered lithium composite oxide sheets tested in the experiment example were observed under an electron microscope at the interface between the conductive bonding layer (disposed between the cathode collector and the sintered sheet) and the sintered sheet. Through the observation, separation (interspace formation) was found to occur at the interface (hereinafter referred to as "bonding interface separation").

The grain boundary cracking is thought to be caused by crystal lattice expansion/contraction associated with intercalation and deintercalation of lithium ions in charge-discharge cycles, wherein the crystal lattice expansion/contraction includes the expansion/contraction of volume and the expansion/contraction not involving change in volume. Similarly, the bonding interface separation is thought to be caused by the tensile or shear stress generated between the sheets and the conductive bonding layer associated with the morphological change of the sintered lithium composite oxide sheet by crystal lattice expansion/contraction. Thus, such grain boundary cracking or bonding interface separation, which results in generation of an electrically isolated portion (i.e., a portion which does not contribute to capacity) through breakage of an electrical conduction path in the sintered lithium composite oxide sheet, to thereby reduce capacity, is thought to be a possible cause for deterioration in cycle characteristic.

SUMMARY OF THE INVENTION

The present invention has conceived in order to solve the aforementioned problems. Thus, an object of the present invention is to provide a lithium secondary battery which has high capacity while maintaining excellent cycle characteristic. Another object of the invention is to provide a cathode of the lithium secondary battery.

<Configuration>

The lithium secondary battery cathode (hereinafter may be referred to simply as "cathode") of the present invention comprises a cathode collector formed of a conductive substance, and a cathode active material layer formed of a sintered lithium composite oxide sheet. The cathode active material layer is bonded to the cathode collector by the mediation of a conductive bonding layer (conductive adhesive layer). In addition to the cathode, the lithium secondary battery of the present invention further includes an anode containing as an anode active material a carbonaceous material or a lithium-occluding substance, and an electrolyte. The electrolyte is disposed so as to intervene the space between the cathode and the anode. A characteristic feature of the present invention resides in that the cathode active material layer has a thickness of 30 µm or more, a voidage of 3 to 30%, and an open pore ratio of 70% or higher.

As used herein, the term "lithium composite oxide" refers to an oxide represented by $Li_xMO_2$ (0.05<x<1.10, M is at least one transition metal (typically, M includes one or more species of Co, Ni, and Mn)) and generally having a layered rock salt structure. As used herein, the term "layered rock salt structure" refers to a crystal structure in which lithium layers and layers of a transition metal other than lithium are arranged in alternating layers with an oxygen layer therebetween; i.e., a crystal structure in which transition metal ion layers and lithium layers are arranged in alternating layers via oxide ions (typically, $\alpha$-$NaFeO_2$ type structure: cubic rock salt type structure in which transition metal and lithium are arrayed orderly in the direction of the [111] axis).

In the case where the sintered lithium composite oxide sheet has a layered rock salt structure, the ratio of intensity of diffraction by the (003) plane to intensity of diffraction by the (104) plane, [003]/[104], as obtained through X-ray diffraction, is preferably 2 or less, more preferably 1 or less, still more preferably 0.5 or less. One possible reason for the improvement of cycle characteristic when the peak intensity ratio [003]/[104] is 2 or less is as follow.

The crystal lattice expansion/contraction (expansion/contraction in volume) associated with charge-discharge cycles occurs to the highest extent in a direction normal to the (003) plane (i.e., [003] direction). Therefore, cracking caused by crystal lattice expansion/contraction associated with charge-discharge cycles readily occurs in a direction parallel to the (003) plane. Furthermore, the (003) plane is a closest packing plane in terms of oxygen and does not allow lithium ions and electron to enter and exit the crystal lattice. Thus, the (003) plane is a chemically and electrochemically inert plane.

Meanwhile, as described above, when the peak intensity ratio [004]/[104] is 2 or less, there is reduced the ratio of the (003) plane which is developed to a plate surface of the sintered lithium composite oxide sheet or to the bonding interface between the sheet and the cathode collector, or the ratio of the (003) plane which is oriented in the direction parallel to the plate surface in the sintered lithium composite oxide sheet. When the decrease in ratio of the (003) plane developed to the bonding interface, the bonding strength at the bonding interface increased, to thereby prevent separation of the sintered sheet. In addition, grain boundary cracking occurring in a direction parallel to the plate surface, which would impair inter alia the capacity, can be effectively prevented. Thus, the cycle characteristic is improved.

Generally, the sintered lithium composite oxide "sheet" may be formed so as to have a ratio with of 3 or more, wherein t represents the thickness of the sheet, and w represents the minimum size in the plate surface direction (direction orthogonal to the thickness direction).

The term "thickness direction" refers to the direction which defines the "thickness" t of the sintered lithium composite oxide sheet; typically, a direction parallel with the vertical direction in a state in which the sintered lithium composite oxide sheet is placed stably on a horizontal surface. The term "thickness" refers to the size of the sintered lithium composite oxide sheet as measured in the "thickness direction."

The term "plate surface" refers to a surface of the sintered lithium composite oxide sheet which is orthogonal to the "thickness direction" of the sheet. Since the "plate surface" of the sintered lithium composite oxide sheet is the widest surface on the sheet, the "plate surface" may be referred to as the "principal surface." The term "plate surface direction" refers to a direction parallel with the "plate surface" (i.e., in-plane direction). Thus, the "thickness" of the sintered lithium composite oxide sheet is equivalent to the shortest distance between the generally parallel two plate surfaces of the sheet. The aforementioned "thickness direction" is the direction which defines the shortest distance between the two "plate surfaces."

Specifically, the thickness t of the sintered lithium composite oxide sheet is determined by, for example, measuring the distance between the generally parallel plate surfaces as observed in cross section under an SEM (scanning electron microscope). The minimum size in the plate surface direction "w" is determined by, for example, taking a plan view of the sintered lithium composite oxide sheet under an SEM, and measuring the diameter of the inscribed circle of the contour of the plan view.

As used herein, the term "voidage" refers to the volume proportion of voids (pores: including open pores and closed pores) in the sintered lithium composite oxide sheet of the present invention. "Voidage" may also be referred to as "porosity." "Voidage" is calculated from, for example, bulk density and true density of the sintered lithium composite oxide sheet.

As used herein, the term "open pore ratio" refers to the ratio by volume of open pores to all the voids (pores) contained in the sintered lithium composite oxide sheet of the present invention. As used herein, the term "open pore" refers to a pore which is contained in the sintered lithium composite oxide sheet of the present invention and which communicates with the outside of the cathode active material. "Open pore ratio" may be calculated from the total number of open pores and closed pores determined by bulk density, and the number of closed pores determined by apparent density. In this case, parameters used for calculation of "open pore ratio" may be determined through, for example, Archimedes' method.

When the sintered lithium composite oxide sheet has a structure in which numerous primary particles (crystal particles) have been bound to one another, the primary particles preferably have a size (primary particle size) of 5 μM or less. One possible reason therefor is as follows. Generally, the smaller the primary particle size, the more the grain boundaries. As the number of grain boundaries increases, the internal stress generated by crystal lattice expansion/contraction associated with charge-discharge cycles is more favorably scattered. Even when cracking occurs, propagation of cracking is effectively prevented in the presence of a large number of grain boundaries. Thus, the cycle characteristic is enhanced.

The cathode collector may be disposed on at least one of the two plate surfaces of the sintered lithium composite oxide sheet. In other words, the cathode collector may be disposed on only one of the two plate surfaces of the sintered lithium composite oxide sheet. Alternatively, the cathode collector may be disposed on each surface (each of the two plate surfaces) of the sintered lithium composite oxide sheet.

In the case where the cathode collector is disposed on each plate surface of the sintered lithium composite oxide sheet, the cathode collector disposed on one plate surface may have a thickness greater than the other cathode collector so as to sustain the sintered lithium composite oxide sheet, and the cathode collector disposed on the other plate surface may have such a structure as not inhibit intercalation/deintercalation of lithium ions into/from the sintered lithium composite oxide sheet (e.g., a mesh-like structure or a porous structure).

The conductive bonding layer may be formed from, for example, a material containing a conductive powder (metallic powder and/or a powder of a conductive carbonaceous material such as acetylene black or graphite) and a binder. The conductive bonding layer may be formed so as to have a thickness of, for example, 0.1 to 20 μm. In order to enhance electroconductivity, each surface of the sintered lithium composite oxide sheet, or one surface thereof to be bonded to the conductive bonding layer may be provided with a conductive thin film (thin film formed of a metal such as Au, Pt, Ag, Al, or Cu, or carbon) through sputtering or a similar technique.

In bonding the cathode active material layer to the cathode collector by the mediation of the conductive bonding layer, one cathode active material layer (including such a layer piece whose shape has been modified so as to adapt to the cathode collector) formed of the sintered lithium composite oxide sheet may be bonded to one cathode collector. Alternatively, the cathode active material layer to be bonded to the cathode collector may be formed of a plurality of sintered lithium composite oxide sheets which are one-dimensionally or two-dimensionally arranged as viewed from the top. In other words, the cathode may be formed by dividing the produced sintered lithium composite oxide sheet through, for example, cutting, to a plurality of fragments, disposing the fragments one-dimensionally or two-dimensionally as viewed from the top, and boding the cathode collector to the thus-disposed fragments. Yet alternatively, two or more cathode active material layers may be disposed. In other words, an additional cathode active material layer may be disposed on the cathode active material layer bonded to the cathode collector. In this case, the two cathode active material layers may be bonded by the mediation of a conductive bonding layer.

<Action and Effect>

In the aforementioned configuration, as described above, the sintered lithium composite oxide sheet includes pores. Therefore, the stress generated by crystal lattice expansion/contraction associated with intercalation and deintercalation of lithium ions in charge-discharge cycles is favorably (uniformly) released by the pores. As a result, grain boundary cracking associated with repeated charge-discharge cycles can be prevented to the possible extent. In addition, by virtue of the pores (open pores) present at the interface with the conductive bonding layer, the bonding strength is enhanced. As a result, deformation of the sintered lithium composite oxide sheet caused by crystal lattice expansion/contraction associated with intercalation and deintercalation of lithium ions in charge-discharge cycles can be prevented, whereby the aforementioned bonding interface separation is favorably prevented. Thus, according to the present invention, the capacity of the cell employing the cathode can be enhanced, while favorable cycle characteristic is maintained.

Particularly when the open pore ratio is adjusted to 70% or higher, stress is more easily released, to thereby effectively prevent grain boundary cracking. One conceivable reason therefor is as follows. As described above, volume expansion/contraction in the cathode is caused by intercalation and deintercalation of lithium ions in crystal lattice. The open pore is surrounded by a face through which intercalation and deintercalation of lithium ions occur. Thus, the open pore is thought to exhibit a stress releasing effect higher than that of the closed pore. In addition, through controlling the open pore ratio to 70% or higher, the aforementioned bonding interface separation is effectively prevented. One conceivable reason therefor is as follows. An open pore is thought to be equivalent to surface roughness. Through incorporation of open pores, surface roughness increases, whereby bonding strength is enhanced by a so-called anchor effect.

Furthermore, through incorporation of electrolyte, conductive material, or the like into an open pore, the inner wall of the open pore favorably serves as a lithium ion intercalation/deintercalation face. Therefore, controlling the open pore ratio to 70% or higher is also preferred, since the rate characteristic is improved, as compared with the case of a high closed pore ratio, the closed pore being present as a simple pore (i.e., a portion which does not contribute to charge-discharge).

In contrast, when the voidage is lower than 3%, the stress releasing effect by pores is insufficient, whereas when the voidage is in excess of 30%, high capacity fails to be attained. Both cases are not preferred.

For example, lithium cobaltate expands its volume upon charge (i.e., deintercalation of lithium ions), whereas lithium nickelate expands its volume upon discharge (i.e., intercalation of lithium ions). Therefore, volume expansion/contraction upon charge-discharge cycles can be apparently reduced to zero by appropriately adjusting the compositional proportion of cobalt or nickel. However, even in this case, lattice length changes. Specifically, $Li(Co_{0.5}Ni_{0.5})O_2$ expands in a c-axis direction and contracts in an a-axis direction.

Therefore, the present invention is very effectively applied to the sintered sheet having the following composition: a lithium composite oxide having a layered rock salt structure (e.g., lithium cobaltate $Li_pCoO_2$ [wherein $1 \leq p \leq 1.1$], lithium nickelate $LiNiO_2$, lithium manganate $Li_2MnO_3$, lithium nickel manganate $Li_p(Ni_{0.5}, Mn_{0.5})O_2$, a solid solution thereof represented by the formula $Li_p(Co_x, Ni_y, Mn_z)O_2$ [wherein $0.97 \leq p \leq 1.07$, $x+y+z=1$], $Li_p(Co_x, Ni_y, Al_z)O_2$ [wherein $0.97 \leq p \leq 1.07$, $x+y+z=1$, $0<x \leq 0.25$, $0.6 \leq y \leq 0.9$, $0<z \leq 0.1$], or a solid solution of $Li_2MnO_3$ and $LiMO_2$ (M is a transition metal such as Co or Ni)). The sintered sheet of the present invention may contain one or more elements selected from among, for example, Mg, Al, Si, Ca, Ti, V, Cr, Fe, Cu, Zn, Ga, Ge, Sr, Y, Zr, Nb, Mo, Ag, Sn, Sb, Te, Ba, and Bi, so long as any of the aforementioned formulas is satisfied.

The present invention is particularly effectively applied to the case of a composition exhibiting increased volume expansion/contraction; for example, $Li_p(Co_x, Ni_y, Mn_z)O_2$ wherein the proportion by mole of nickel is 0.75 or more or the proportion by mole of cobalt is 0.9 or more, or $Li_p(Co_x, Ni_y, Al_z)O_2$ wherein the proportion by mole of nickel is 0.7 or more.

DETAILED DESCRIPTION OF THE INVENTION

Preferred embodiments of the present invention will next be described with reference to examples and comparative examples. The following description of the embodiments is nothing more than the specific description of mere example embodiments of the present invention to the possible extent in order to fulfill description requirements (descriptive requirement and enabling requirement) of specifications required by law. Thus, as will be described later, naturally, the present invention is not limited to the specific configurations of embodiments and examples to be described below. Modifications that can be made to the embodiments and examples are collectively described herein principally at the end, since insertion thereof into the description of the embodiments would disturb understanding of consistent description of the embodiments.

<Configuration of Lithium Secondary Battery>

Figure 1A:
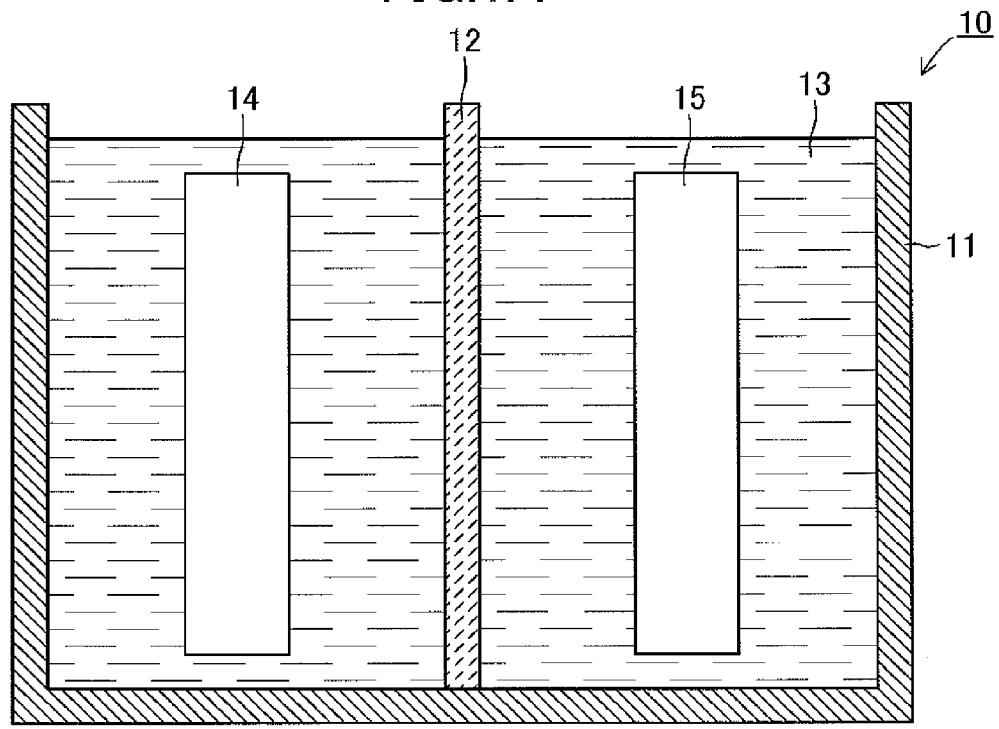
FIG. 1A is a sectional view of the schematic configuration of an embodiment of the lithium secondary battery of the present invention.

FIG. 1A is a sectional view of the schematic configuration of an lithium secondary battery 10 to which an embodiment of the present invention is applied. Referring to FIG. 1A, the lithium secondary battery 10 of the embodiment has a cell casing 11, a separator 12, an electrolyte 13, an anode 14, and a cathode 15.

The separator 12 is provided so as to halve the interior of the cell casing 11 into the anode 14 section and the cathode 15 section. That is, the anode 14 and the cathode 15 are provided within the cell casing 11 in such a manner as to face each other with the separator 12 located therebetween. The cell casing 11 accommodates the electrolyte 13.

Figure 1B:
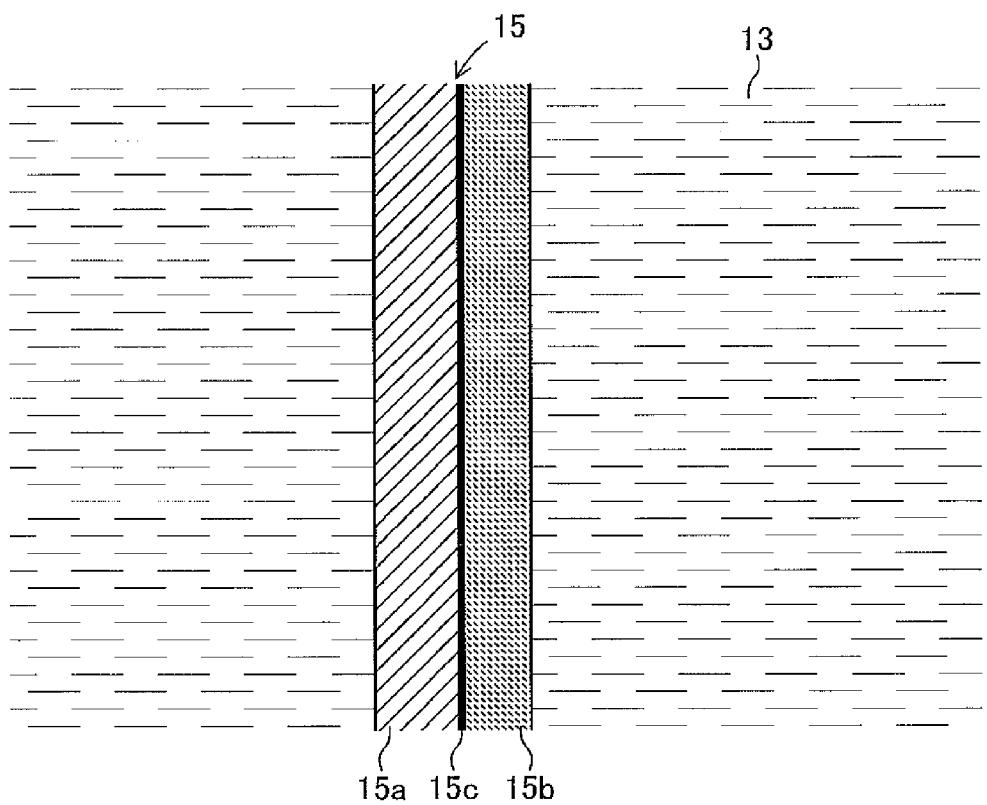
FIG. 1B is an enlarged sectional view of the cathode shown in FIG. 1A.

The electrolyte 13 which may be in the present invention is preferably a liquid electrolyte from the viewpoints, for example, electrical characteristics and easy handlability. The liquid electrolyte which may be employed in the present invention is preferably a nonaqueous-solvent-type which is prepared by dissolving an electrolyte salt such as a lithium salt in a nonaqueous solvent such as an organic solvent. The electrolyte 13 may be a polymer electrolyte, a gel electrolyte, an organic solid electrolyte, or an inorganic solid electrolyte, and no problem arises when such an electrolyte is employed. In a preferred mode, the electrolyte is charged into open pores provided in the cathode active material layer (i.e., a cathode active material layer 15b in FIG. 1B given hereinbelow) or penetrate the cathode active material layer, form the viewpoint of activating intercalation/deintercalation of lithium ions into/from the cathode active material.

No particular limitation is imposed on the solvent for the nonaqueous electrolytic solution. Examples of the solvent include chain esters, such as dimethyl carbonate, diethyl carbonate, ethyl methyl carbonate, and methyl propione carbonate; cyclic esters having high dielectric constant, such as ethylene carbonate, propylene carbonate, butylene carbonate, and vinylene carbonate; and mixed solvents of a chain ester and a cyclic ester. Among them, a mixed solvent containing a chain ester serving as a main solvent with a cyclic ester is particularly preferred.

Examples of the electrolyte salt to be dissolved in the above-mentioned nonaqueous solvent include $LiClO_4$, $LiPF_6$, $LiBF_4$, $LiAsF_6$, $LiSbF_6$, $LiCF_3SO_3$, $LiC_4F_9SO_3$, $LiCF_3Co_2$, $Li_2C_2F_4(SO_3)_2$, $LiN(RfSO_2)(Rf'SO_2)$, $LiC(RfSO_2)_3$, $LiC_nF_{2n+1}SO_3$ (n≥2), and $LiN(RfOSO_2)_2$ [Rf and Rf' each represent a fluoroalkyl group]. They may be used singly or in combination of two or more species.

Among the above-mentioned electrolyte salts, a fluorine-containing organic lithium salt having a carbon number of 2 or greater is particularly preferred. This is because the fluorine-containing organic lithium salt is high in anionic property and readily undergoes electrolytic dissociation, and is thus readily dissolvable in the above-mentioned solvent. No particular limitation is imposed on the electrolyte salt concentration of the nonaqueous electrolytic solution (electrolyte 13). However, for example, the concentration is 0.3 mol/L to 1.7 mol/L, more preferably 0.4 mol/L to 1.5 mol/L.

Any anode active material may be used in the anode 14, so long as the material can occlude and release lithium ions. For example, there may be used carbonaceous materials (e.g., graphite, pyrolytic carbon, coke, glassy carbon, a fired product of organic polymer compound, mesocarbon microbeads, carbon fiber, and activated carbon). Further, a portion of graphite may be replaced with a metal which can be alloyed with, for example, lithium or an oxide. Also, there may be used, as the anode active material, metallic lithium; an alloy which contains metallic lithium and another element (e.g., silicon, tin, or indium); an oxide of silicon, tin, or the like which can perform charge and discharge at low electric potential near that at which lithium does; and a lithium-occluding material such as a lithium cobalt nitride (e.g., $Li_{2.6}Co_{0.4}N$).

When graphite is employed as the anode active material, the voltage at full charge can be considered to be about 0.1 V (vs. lithium). Thus, the electric potential of the cathode 15 can be conveniently calculated as a cell voltage plus 0.1 V. Therefore, since the electric potential of the cathode 15 at charging is readily controlled, graphite is preferred.

FIG. 1B is an enlarged sectional view of the cathode 15 shown in FIG. 1A. Referring to FIG. 1B, the cathode 15 includes a cathode collector 15a and a cathode active material layer 15b. The cathode collector 15a is formed of a conductive material such as a metal (e.g., aluminum foil) and bonded to the cathode active material layer 15b via conductive bonding layer 15c. The cathode active material layer 15b is composed of a sintered lithium composite oxide sheet and has a thickness of 30 μm or more (specifically 30 to 200 μm), a voidage of 3 to 30%, and an open pore ratio of 70% or higher.

<Summary of Method for Producing a Sintered Lithium Composite Oxide Sheet Employed in Cathode Active Material Layer>

The sintered lithium composite oxide sheet employed in cathode active material layer 15b shown in FIG. 1B is readily and reliably formed through, for example, the following production method.

<Two-Step Process>

1. Preparation of Raw Material Particles

Particles of a transition metal (e.g., Co, Ni, or Mn) compound containing no lithium compound are employed as raw material particles. The raw material particles may be appropriately pulverized and classified. In consideration of a composition of interest, a plurality of types of raw material particles may be appropriately mixed together. The raw material particles may be mixed with a low-melting-point oxide (e.g., boron oxide, bismuth oxide, or antimony oxide), a low-melting-point chloride (e.g., sodium chloride or potassium chloride), or a low-melting-point glass material (e.g., borosilicate glass) in an amount of 0.001 to 30 wt. % for the purpose of promoting grain growth.

To the raw material particles, an additive for forming pores having a voidage of interest as mentioned above; i.e., a pore-forming material may be added, followed by uniformly mixing. The pore-forming material is preferably a particulate or fibrous substance which decomposes (vaporizes or is carbonized) in the subsequent calcination step. Specific examples of preferably employed pore-forming materials include theobromine, graphite, and organic synthetic resins such as nylon, phenolic resin, poly(methyl methacrylate), polyethylene, poly(ethylene terephthalate), and foamable resin, in the form of particle or fiber. Needless to say, if no such a pore-forming material is added, the pores having a size and voidage of interest as mentioned above can be formed through appropriately tuning the particle size of the raw material particles, the firing temperature employed in the calcination step, etc.

2. Raw Material Particle Sheet Forming Step

Raw material particles or a mixture thereof is subjected to a sheet forming step, to thereby form an "independent" sheet-like compact. As used herein, "independent" sheet (may be referred to as "self-standing film") refers to a sheet which is independent of another support and can be handled by itself. The term "independent sheet-like compact" also means thin tablets having an aspect ratio of 5 or higher. Therefore, "independent" sheet does not include a sheet bonded to and integrated with another support (e.g., substrate) (i.e., impossible or difficult to separate from the support).

Sheet forming may be carried out through any well known technique. Specifically, sheet forming may be performed by means of, for example, a doctor blade-type sheet forming machine (doctor blade method), a drum dryer, a disk dryer, or a screen printing machine. The thickness of a sheet-like compact is appropriately determined so as to attain the aforementioned preferred thickness after firing.

3. Compact Calcination Step

The sheet-like compact formed through the aforementioned forming step is fired at a relatively low temperature (e.g., 700 to 1,200° C.) before the below-described lithium incorporation step. This calcination step forms a porous sheet-like intermediate fired compact containing numerous pores of relatively large size. This calcination step is carried out in air in a state where, for example, the above-formed sheet-like compact is placed on a zirconia-made embossed setter.

4. Lithium Incorporation Step

A lithium compound is applied to the intermediate fired compact obtained through the aforementioned calcination step, followed by thermal treatment, whereby lithium is incorporated into the intermediate fired compact. Thus, there is produced an "independent" sintered lithium composite oxide sheet for a cathode active material layer. The lithium incorporation step is carried out in, for example, a crucible.

Examples of the employable lithium compound include lithium salts such as lithium carbonate, lithium nitrate, lithium acetate, lithium peroxide, lithium hydroxide, lithium chloride, lithium oxalate, and lithium citrate; and lithium alkoxides such as lithium methoxide and lithium ethoxide. The lithium compound is added so that, in the sheet-like sintered compact represented by the formula $Li_xMO_2$, the ratio by mole of lithium to M (i.e., Li/M) is 1 or more.

When lithium is incorporated into the porous sheet-like intermediate fired compact yielded in the aforementioned calcination step, the pore size of the intermediate fired compact is decreases, whereby the aforementioned voidage is attained.

<One-Step Process>

1. Preparation of Raw Material Particles

As raw material particles, there is used an appropriate particle mixture of compounds of Li, Co, Ni, Mn, etc. at such proportions that the formed cathode active material $LiMO_2$ has a layered rock salt structure. Alternatively, raw material particles having a $LiMO_2$ composition (synthesized) may also be used. To such raw material particles, the aforementioned pore-forming material is added.

In the below-mentioned thermal treatment step, a lithium compound may be added in an excessive amount of about 0.5 to about 30 mol % in order to promote grain growth or compensate for volatile matter. Also, for promoting grain growth, a low-melting-point oxide such as bismuth oxide or a low-melting-point glass such as borosilicate glass may be added in an amount of 0.001 to 30 wt. %.

Particularly when a thick sintered sheet having a thickness of 50 μm or more is formed, sheet-like $LiMO_2$ oriented particles whose crystal planes other than the (003) plane are oriented to a plate surface and which have a thickness of about 0.5 to about 20 μm may be added in an amount of 2 to 30 wt. % in order to enhance the orientation degree. Such sheet-like oriented particles can enhance the orientation degree when particles are dispersed in such a state that a plate surface is in parallel to a sheet surface during sheet forming in which shear force is applied (e.g., the doctor blade method) and when grain growth occurs together with co-present raw material particles in the firing step. The sheet-like oriented particles may be produced through, for example, producing sintered sheets having a thickness of 20 μm or less according to the production method disclosed in the specification and appropriately crushing the sheets after firing.

2. Raw Material Particle Sheet Forming Step

Through subjecting a mixture of raw material particles and a pore-forming material to sheet forming, an "independent" sheet-like compact is produced. The sheet forming step is the same as the aforementioned two-step process.

3. Compact Thermal Treatment (Firing) Step

The sheet-like compact formed through the aforementioned forming step is thermally treated (fired) at a relatively high temperature (e.g., 1,200° C. to 1,500° C.) in order to proceed crystal growth with formation of pores, to thereby yield an "independent" sintered lithium composite oxide sheet for a cathode active material layer. This thermal treatment may be carried out in an oxygen atmosphere where, for example, the above-formed sheet-like compact is placed on a zirconia-made embossed setter.

<Evaluation Method and Results>

Figure 2:
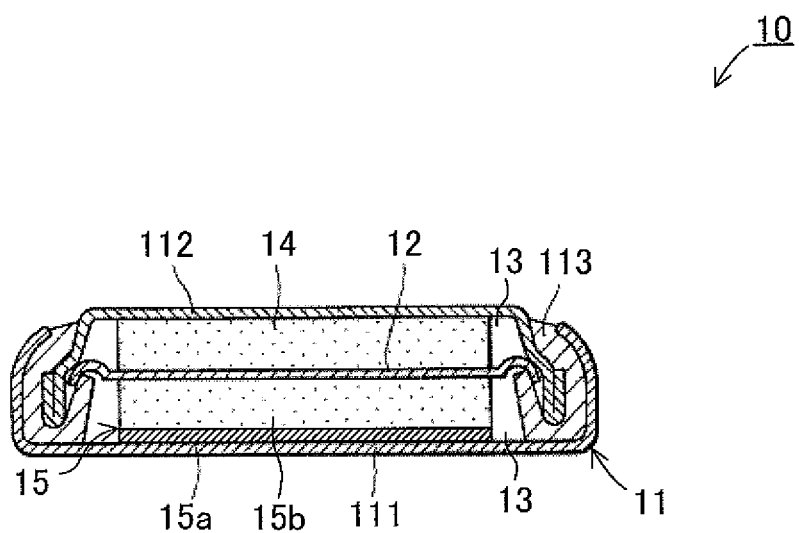
FIG. 2 is a sectional view schematically showing the structure of a coin-cell-type lithium secondary battery employed for evaluating cell characteristics.

For the evaluation of cell characteristics, a coin cell having the same shape as that of a type CR2032 cell was fabricated in the following manner. FIG. 2 is a sectional view schematically showing the structure of a coin-cell-type lithium secondary battery 10.

A cathode active material layer 15b was formed from the produced "independent" sintered lithium composite oxide sheet, and the layer was worked into pieces having a φ of about 5 to about 10 mm. Separately, a mixture of acetylene black and PVdF (1:0.6 by mass) was mixed with an appropriate amount of NMP serving as a solvent, to thereby prepare a paste. The paste was applied onto a cathode collector 15a formed of aluminum foil through screen printing. The sintered plate was placed such that the plate was located inside the printed pattern in an undried state and was dried at 100° C. for 30 minutes, to thereby complete bonding, whereby a cathode 15 was produced. The thickness of the conductive bonding layer 15c was adjusted to 10 to 20 μm.

In the space between a cathode can 111 and an anode can 112 forming a cell casing 11, there was placed a stacked body in which a cathode 15 (a cathode collector 15a facing opposite the cathode can 111), a separator 12, and an anode 14 (metallic lithium plate) were stacked in this order. The cell casing was filled with a liquid electrolyte 13 and sealed with a gasket 113, to thereby fabricate the coin-cell-type lithium secondary battery 10. The liquid electrolyte 13 was prepared by dissolving $LiPF_6$ in an equivolume mixture of ethylene carbonate (EC) and diethyl carbonate (DEC) serving as an organic solvent to a concentration of 1 mol/L.

The thus-fabricated coin cell was evaluated in terms of cycle characteristic (percent capacity maintenance).

Cycle Characteristic (Percent Capacity Maintenance):

The fabricated cell was subjected to cyclic charge-discharge at a test temperature of 20° C. The cyclic charge-discharge repeats: (1) charge at 1 C rate of constant current and constant voltage until 4.2 V is reached, and (2) discharge at 1 C rate of constant current until 3.0 V is reached. By dividing the discharge capacity of the cell as measured after the cyclic charge-discharge by the initial discharge capacity of the cell and being multiplied by 100, percent capacity maintenance (%) was obtained. Rate characteristic:

The above-fabricated cell was evaluated through the following charge and discharge operations at a test temperature of 20° C. One cycle consists of the following charge and discharge operations: constant-current charge is carried out at 0.1 C rate of current until the cell voltage becomes 4.2 V;

subsequently, constant-voltage charge is carried out under a current condition of maintaining the cell voltage at 4.2 V, until the current drops to 1/20, followed by 10 minutes rest; and then, constant-current discharge is carried out at a specific rate of current until the cell voltage becomes 3.0 V.

Figure 3A:
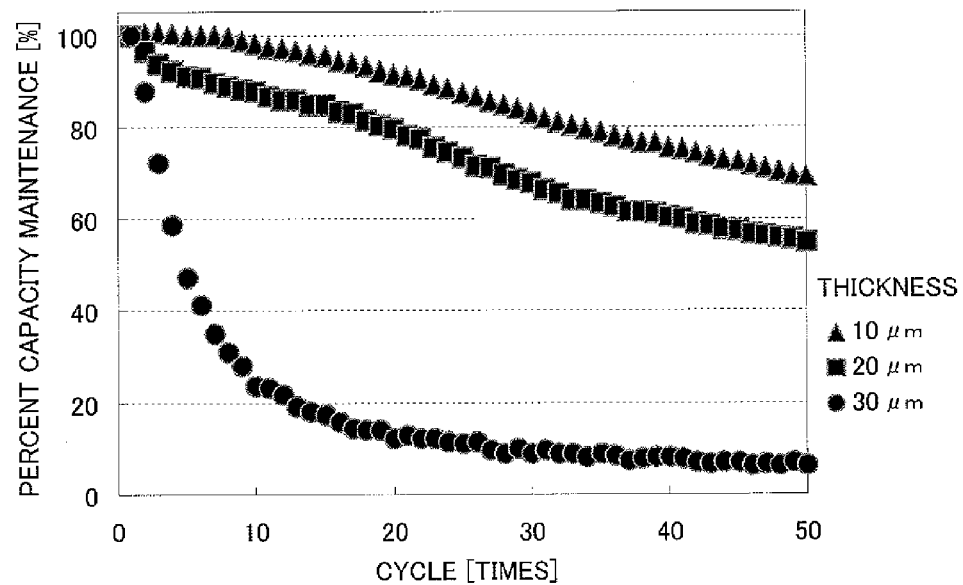
FIGS. 3A and 3B are graphs showing cyclic characteristics of $LiCoO_2$ ceramic sheets of the embodiments and comparative examples.
Figure 3B:
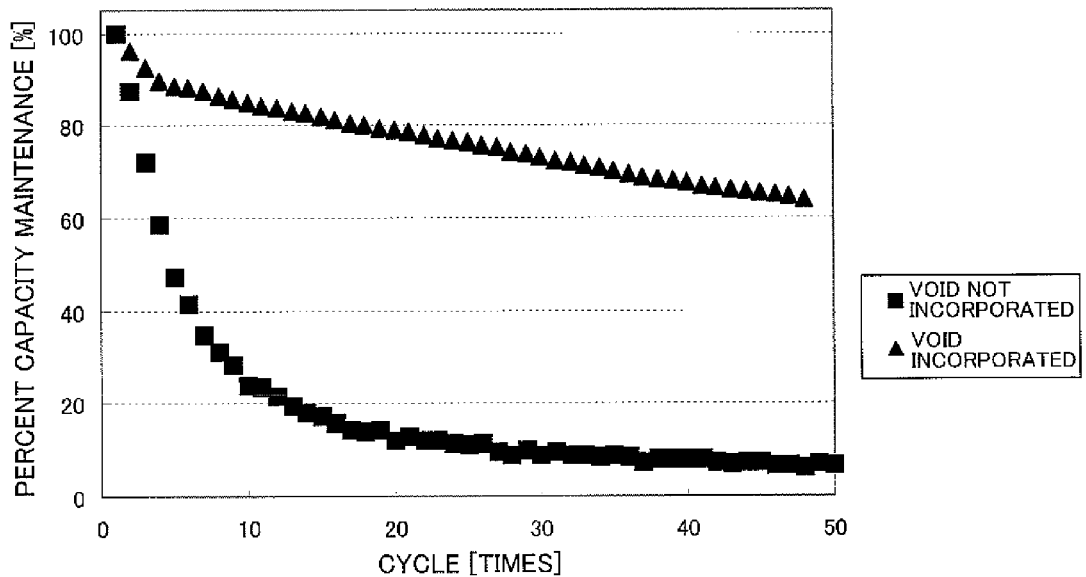

FIGS. 3A and 3B are graphs showing cyclic characteristics of $LiCoO_2$ ceramic sheets of the embodiments and comparative examples. In FIG. 3A, the graph shows the cyclic characteristics of $LiCoO_2$ ceramic sheets of comparative examples in which no void has been provided, while the graph of FIG. 3B shows the cyclic characteristics of $LiCoO_2$ ceramic sheets (thickness: 30 μm) according to the embodiment in which voids have been provided.

As shown in the graph of FIG. 3A, the cyclic characteristics of the $LiCoO_2$ ceramic sheets in which no void had been provided were impaired as the thickness increased. In particular, an $LiCoO_2$ ceramic sheet having a thickness of 30 μm exhibited considerably impaired cycle characteristic. In contrast, as shown in the graph of FIG. 3B, a void-provided $LiCoO_2$ ceramic sheet having a thickness of 30 μm was found to exhibit remarkably improved cycle characteristic.

Figure 4A:
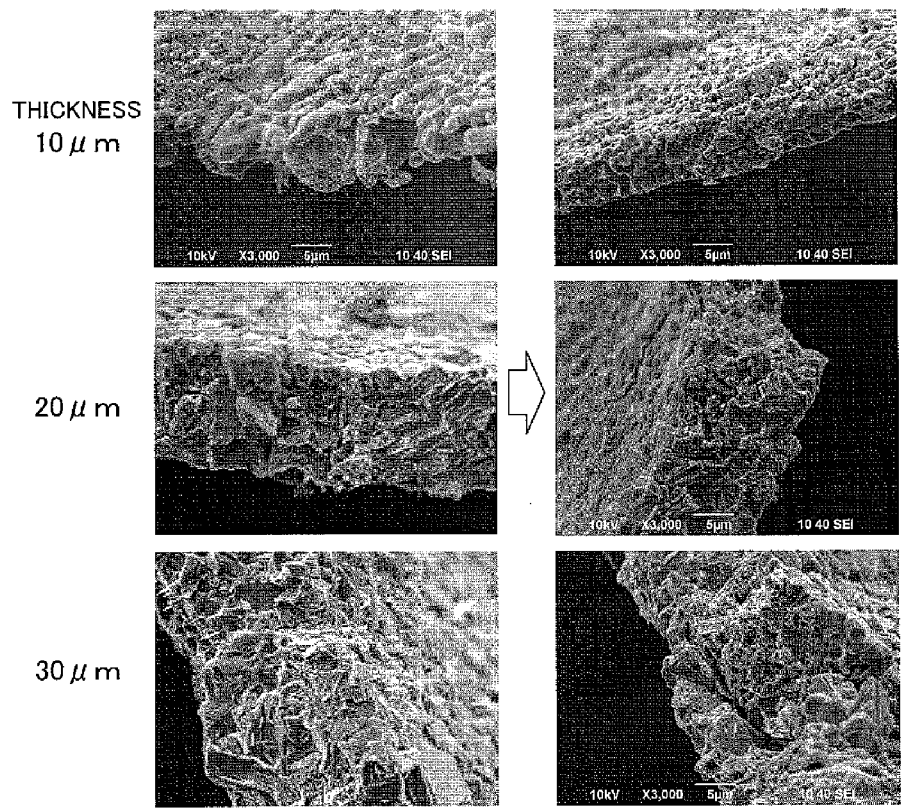
FIGS. 4A to 4C are photographs of $LiCoO_2$ ceramic sheets of the embodiments and comparative examples, taken under a scanning electron microscope.
Figure 4B:
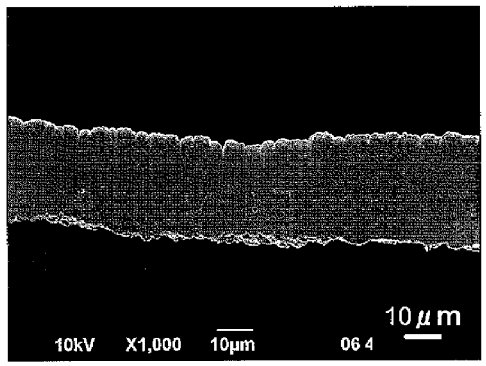
Figure 4C:
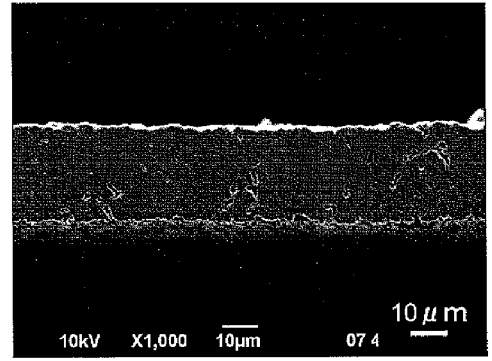

FIGS. 4A to 4C are photographs of $LiCoO_2$ ceramic sheets of the embodiments and comparative examples, taken under a scanning electron microscope. In FIGS. 4A to 4C, there are given photographs of $LiCoO_2$ ceramic sheets of comparative examples in which no void has been provided. Each of the SEM photographs on the left side shows a corresponding ceramic sheet removed through decomposition of the as-produced coin cell, and each of the SEM photographs on the right side shows a corresponding ceramic sheet removed through decomposition of the coin cell after 50 charge-discharge cycles. FIG. 4B is a SEM photograph of a cross-section of an $LiCoO_2$ ceramic sheet of a comparative example in which no void has been provided. FIG. 4C is a SEM photograph of a cross-section of an $LiCoO_2$ ceramic sheet of the embodiment in which voids have been provided (voidage: 8%).

As shown in FIG. 4A, in $LiCoO_2$ ceramic sheets of comparative examples in which no void had been provided, grain boundary cracking was observed after 50 charge-discharge cycles. This grain boundary cracking is thought to be caused by internal stress generated by crystal lattice expansion/contraction associated with intercalation and deintercalation of lithium ions in charge-discharge cycles. In addition, after 50 charge-discharge cycles, a 50% of the area of the conductive bonding layer was found to be separated from the interface between the bonding layer and the ceramic sheet during peeling from the collector of the $LiCoO_2$ ceramic sheet of the comparative example in which no void had been provided. The deterioration in cycle characteristic of the $LiCoO_2$ ceramic sheets in which no void has been provided is thought to be caused by such grain boundary cracking and bonding interface separation of the conductive bonding layer, which result in generation of an electrically isolated portion (i.e., a portion which does not contribute to capacity) through breakage of an electrical conduction path in each $LiCoO_2$ ceramic sheet, to thereby reduce capacity.

Figure 5:
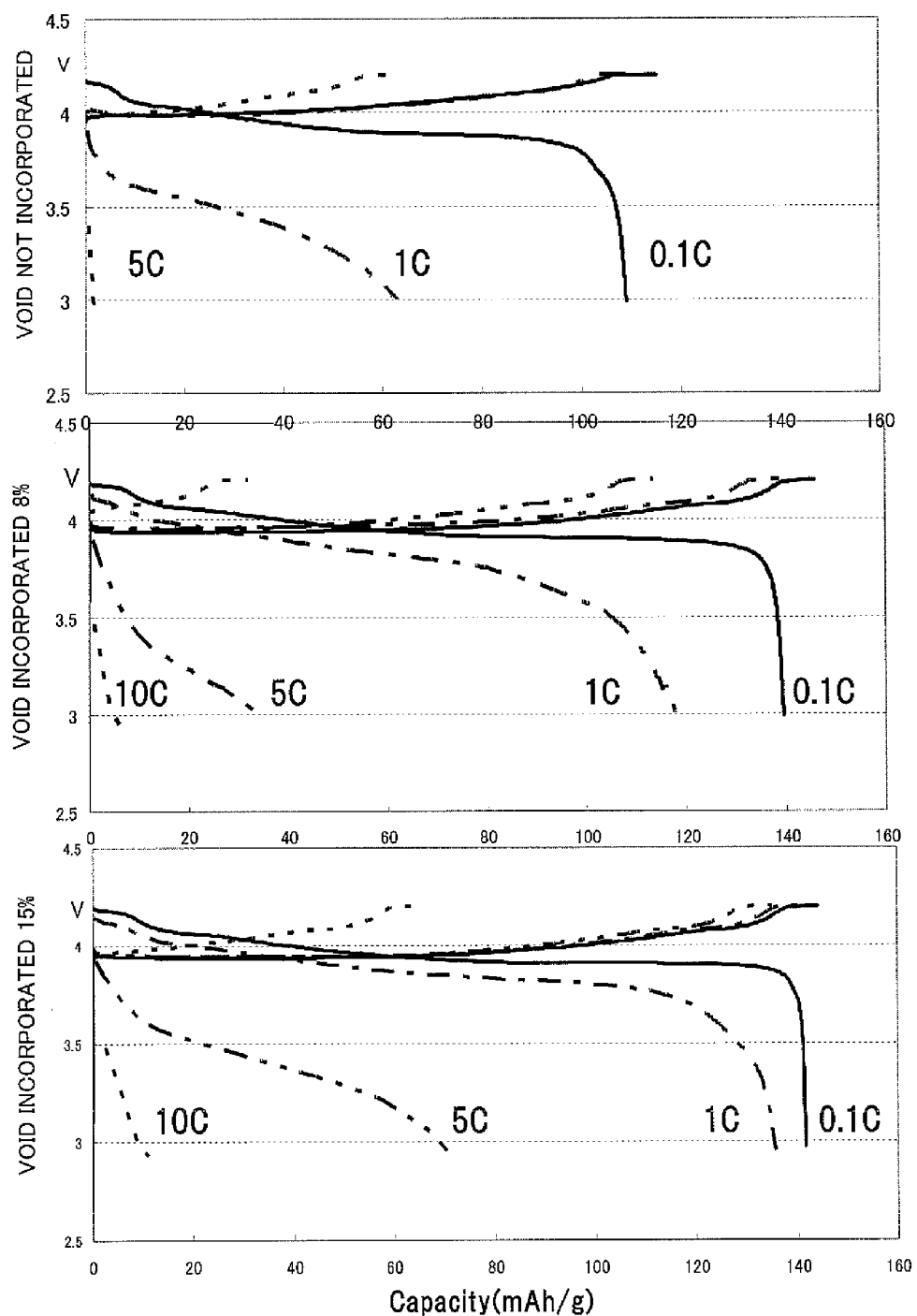
FIG. 5 shows graphs showing rate characteristics of $LiCoO_2$ ceramic sheets of the embodiment in which voids have been provided.

Thus, in order to relax internal stress generated by crystal lattice expansion/contraction associated with intercalation and deintercalation of lithium ions in charge-discharge cycles and to enhance bonding strength of the conductive bonding layer and the ceramic sheet, the present inventors have provided voids in the $LiCoO_2$ ceramic sheet at a voidage falling within the aforementioned range. Through provision of such voids, as described above, remarkable improvement of the cycle characteristic was observed. FIG. 5 shows graphs showing rate characteristics of $LiCoO_2$ ceramic sheets of the embodiments in which voids have been provided. As shown in FIG. 5, through provision of voids in the ceramic sheet, the cycle characteristic and rate characteristic of the cell employing the ceramic sheet were found to be improved.

EXAMPLES

The present invention will next be described in more detail by way of specific examples of sintered lithium composite oxide sheets serving as the aforementioned cathode active material layer 15b. Evaluations of the sheets are also described.

Example 1

Specific Example 1

Cobalt-Based Composition

In Experiment Examples 1-1 to 1-9, $LiCoO_2$ ceramic sheets were produced under the conditions shown in Table 1.

TABLE 1

| | Process | Material particle size (μm) | Calcining temp. (° C.) | Pore-forming material shape/amount (wt. parts) |
|---|---|---|---|---|
| Exp. Ex. 1-1 | 1 step | | | fibrous/5 |
| Exp. Ex. 1-2 | 2 step | 0.3 | 1,100 | 0 |
| Exp. Ex. 1-3 | 2 step | 0.3 | 1,100 | fibrous/5 |
| Exp. Ex. 1-4 | 2 step | 0.5 | 1,000 | 0 |
| Exp. Ex. 1-5 | 2 step | 1.0 | 1,000 | fibrous/5 |
| Exp. Ex. 1-6 | 1 step | | | fibrous/7.5 |
| Exp. Ex. 1-7 | 1 step | | | fibrous/12.5 |
| Exp. Ex. 1-8 | 1 step | | | fibrous/2.5 |
| Exp. Ex. 1-9 | 1 step | | | spherical/5 |

The detailed production conditions employed in Experiment Examples 1-2 and 1-4 shown in Table 1 are as follows (two-step process, no pore-forming material).
(1) Preparation of Slurry
$Co_3O_4$ powder (particle size: 1 to 5 μm; product of Seido Kagaku Kogyo Co., Ltd.) was crushed and classified to prepare $Co_3O_4$ raw material powder. The $Co_3O_4$ raw material powder (100 parts by weight) was mixed with a dispersion medium (toluene:isopropanol=1:1) (100 parts by weight), a binder (polyvinyl butyral: product No. "BM-2," product of Sekisui Chemical Co. Ltd.) (10 parts by weight), a plasticizer (DOP: di(2-ethylhexyl)phthalate, product of Kurogane Kasei Co., Ltd.) (4 parts by weight), and a dispersant (trade name "RHEODOL SP-O30," product of Kao Corporation) (2 parts by weight). The resultant mixture was stirred under reduced pressure for defoaming, and the viscosity thereof was adjusted to 3,000 to 4,000 cP. The viscosity was measured by means of an LVT-type viscometer (product of Brookfield) in Specific Example 1 and other Examples.
(2) Sheet Forming
The thus-prepared slurry was formed into a sheet-like compact on a PET film through the doctor blade method so that the thickness of the compact as measured after drying was adjusted to 30 μm.
(3) Calcination
The sheet-like compact was removed from the PET film and was cut into square pieces (70 mm×70 mm) by means of a cutter. Each piece was placed at the center of the aforementioned zirconia-made setter (90 mm×90 mm, height: 1 mm) having an embossed (protrusion: 300 μm) surface. The piece was heated in air at a specific temperature (firing temperature for yielding an intermediate fired product) for 5 hours. Thereafter, the piece was cooled at 200 degrees (° C.)/h. Then, a portion of the piece which was not fused to the setter was removed from the furnace.

(4) Lithium Incorporation

LiNO$_3$ powder (product of Kanto Chemical Co., Inc.) was applied to the thus-obtained Co$_3$O$_4$ ceramic sheet so that the ratio by mole of Li/Co was 1.2, and the mixture was thermally treated in a crucible (atmospheric conditions) at 840° C. for 20 hours, to thereby produce an "independent" LiCoO$_2$ ceramic sheet having a thickness of 30 μm for the cathode active material layer 15b.

The detailed production conditions employed in Experiment Examples 1-3 and 1-5 shown in Table 1 are as follows (Two-step process, pore-forming material added).

A slurry was prepared through the same procedure employed in, for example, Experiment Example 1-2, except that a pore-forming material was added. As the pore-forming material, a fibrous material (Celish PC10S, product of Daicel FineChem LTd.) or a spherical material (Nylon powder, product of Sumitomo Environ Science) was employed. The thus-prepared slurry was formed into a sheet on a PET film in the same manner as employed in, for example, Experiment Example 1-2.

The sheet-like compact was removed from the PET film and was cut into square pieces (70 mm×70 mm) by means of a cutter. Each piece was placed at the center of the aforementioned zirconia-made setter and heated in air at 900° C. (firing temperature for yielding an intermediate fired product) for 10 hours. Thereafter, the piece was cooled at 200 degrees (° C.)/h. Then, a portion of the piece which was not fused to the setter was removed from the furnace. Lithium was incorporated into the thus-obtained Co$_3$O$_4$ ceramic sheet in the same manner as employed in, for example, Experiment Example 1-2, to thereby produce an "independent" LiCoO$_2$ ceramic sheet having a thickness of 30 μm for the cathode active material layer.

The detailed production conditions employed in Experiment Examples 1-1 and 1-6 to 1-9 shown in Table 1 are as follows (One-step process).

(1) Preparation of Slurry

Co$_3$O$_4$ powder (particle size: 1 to 5 μm; product of Seido Kagaku Kogyo Co., Ltd.) was crushed and classified to prepare Co$_3$O$_4$ raw material powder. The Co$_3$O$_4$ raw material powder (particle size: 0.3 μm) was mixed with Li$_2$CO$_3$ powder (product of Kanto Chemical Co., Inc.) at a ratio Li/Co (mole) of 1.0. Thereafter, the aforementioned experiment procedure was repeated, except that the thus-obtained powder (100 parts by weight) and the aforementioned pore-forming material were employed, to thereby prepare a slurry (viscosity: 500 to 700 cP).

(2) Sheet Forming

The thus-prepared slurry was formed into a sheet-like compact on a PET film through the doctor blade method so that the thickness of the compact as measured after drying was adjusted to 30 μm.

(3) Thermal Treatment

The sheet-like compact was removed from the PET film and was cut into square pieces (70 mm×70 mm) by means of a cutter. Each piece was placed at the center of the aforementioned zirconia-made setter, and the piece was heated in an oxygen atmosphere (oxygen partial pressure: 0.1 MPa) at 900° C. for 10 hours. Thereafter, a portion of the piece which was not fused to the setter was removed from the furnace, to thereby produce an "independent" LiCoO$_2$ ceramic sheet having a thickness of 30 μm for the cathode active material layer.

Table 2 shows the evaluation results of Experiment Examples shown in Table 1. In Table 2, the term "percent capacity maintenance" was obtained from the capacity after completion of 50 charge-discharge cycles. The "voidage" was obtained by dividing the bulk density of each sintered sheet (measured through the Archimedes' method) by the true density thereof (measured by means of a picnometer), to thereby obtain the relative density, and subtracting the relative density from 1. In the measurement of bulk density, the tested sintered sheet was boiled in water in order to sufficiently remove air remaining in the pores. When the sample had a small pore size, the pores of the sample were impregnated in advance with water by means of a vacuum impregnation apparatus (CitoVac, product of Struers), and the thus-treated sample was subjected to boiling treatment. The "open pore ratio" is a value calculated from the closed pore ratio and the total pore ratio [(open pore ratio)=(number of open pores)/(total number of all pores)=(number of open pores)/(number of open pores and closed pores). The closed pore ratio is calculated from an apparent density determined through the Archimedes' method. The total pore ratio is calculated from a bulk density determined through the Archimedes' method.

TABLE 2

|  | Voidage (%) | Open pore ratio (%) | Primary particle size (μm) | Percent capacity maintenance (%) |
| --- | --- | --- | --- | --- |
| Exp. Ex. 1-1 | 3.2 | 71 | 1 | 89 |
| Exp. Ex. 1-2 | 3.1 | 82 | 0.7 | 90 |
| Exp. Ex. 1-3 | 3 | 96 | 0.5 | 92 |
| Exp. Ex. 1-4 | 7.5 | 80 | 1.5 | 90 |
| Exp. Ex. 1-5 | 8 | 98 | 2 | 95 |
| Exp. Ex. 1-6 | 12 | 70 | 3.1 | 90 |
| Exp. Ex. 1-7 | 30 | 71 | 4.2 | 92 |
| Exp. Ex. 1-8 | 2.8 | 72 | 3.3 | 35 |
| Exp. Ex. 1-9 | 3 | 61 | 4.5 | 50 |

As is clear from Tables 1 and 2, the sintered sheets of Experiment Examples 1-1 to 1-7, which had a voidage of 3 to 30% and an open pore ratio of 70% or higher, exhibited excellent percent capacity maintenance, even after completion of 50 charge-discharge cycles. In contrast, the sintered sheet of Experiment Example 1-8, which had a voidage lower than the lower limit of the aforementioned range, and the sintered sheet of Experiment Example 1-9, which had an open pore ratio lower than the lower limit of the aforementioned range, exhibited considerably impaired cyclic characteristic (i.e., percent capacity maintenance after completion of 50 charge-discharge cycles). One possible reason therefor is as follows.

The sintered sheets of Experiment Examples 1-1 to 1-7 each include pores having a voidage falling within the aforementioned range at a specific proportion. Therefore, the stress generated by crystal lattice expansion/contraction associated with intercalation and deintercalation of lithium ions in charge-discharge cycles is favorably (uniformly) released. As a result, grain boundary cracking associated with charge-discharge cycles can be prevented to the possible extent. Particularly when the open pore ratio is adjusted to 70% or higher, stress release is more readily attained, to thereby effectively prevent grain boundary cracking. In addition, since the bonding strength between the ceramic sheet for the cathode active material layer and the conductive bonding layer is enhanced, the aforementioned bonding interface separation is effectively prevented. Thus, according to the sintered sheets of Experiment Examples 1-1 to 1-7, the capacity of the cell employing each sintered sheet can be enhanced, while favorable cycle characteristic is maintained.

Furthermore, when an electrolyte permeates an open pore, the inner wall of the open pore favorably serves as a lithium intercalation/deintercalation face. Therefore, through controlling the open pore ratio to 70% or higher, the rate characteristic is improved, as compared with the case of a high closed pore ratio.

In contrast, when the voidage is lower than 3% (Experiment Example 1-8) or the open pore ratio is lower than 70% (Experiment Example 1-9), the stress releasing effect by pores (grain boundary cracking prevention effect) and bonding interface separation prevention effect are insufficient. Actually, the cycle characteristic was considerably impaired.

Next, the ratio of intensity of X-ray diffraction by the (003) plane to intensity of X-ray diffraction by the (104) plane; i.e., the peak intensity ratio [003]/[104] was evaluated. XRD (X-ray diffraction) was carried out though the following procedure.

Specifically, a ceramic sheet for the cathode active material layer, which had been worked to a φ of about 5 to about 10 mm, was placed on a sampler holder for XRD. By means of an XRD apparatus (RINT-TTR III, product of Rigaku Corp.), the surface of the ceramic sheet for the cathode active material layer was irradiated with X-ray so as to measure an XRD profile, thereby obtaining the ratio of intensity (peak height) of diffraction by the (003) plane to intensity (peak height) of diffraction by the (104) plane, [003]/[104]. Thus, according to the above-mentioned method, there is obtained a profile of diffraction by crystal faces present in parallel with crystal faces of the plate surface; i.e., a profile of diffraction by crystal faces oriented in a plate surface direction.

In order to evaluate the influence of the peak intensity ratio [003]/[104], sintered sheet samples of Experiment Examples 1-10 to 1-13, which had the same voidage and open pore ratio but varied orientation degrees, were produced. In Experiment Examples 1-10 to 1-13, the same raw material particle size and firing temperature for yielding an intermediate fired product as employed in Experiment Example 1-5 were employed, whereby the same voidage and open pore ratio (voidage: 8%, open pore ratio; 98%) as employed in Experiment Example 1-5 were realized. However, lithium introduction conditions (i.e., type and amount of lithium compound, and treatment temperature: see, Table 3) were appropriately modified, to thereby vary the orientation degree. Table 4 shows the results.

TABLE 3

| | Li compd. | Li/M mole ratio | Li incorporation temp. (° C.) |
|---|---|---|---|
| Exp. Ex. 1-10 | $Li_2O_2$ | 1 | 775 |
| Exp. Ex. 1-11 | $LiNO_3$ | 1 | 800 |
| Exp. Ex. 1-5 | $LiNO_3$ | 1.2 | 840 |
| Exp. Ex. 1-12 | $Li_2CO_3$ | 5 | 870 |
| Exp. Ex. 1-13 | $Li_2CO_3$ | 10 | 900 |

TABLE 4

| | Voidage (%) | Open pore ratio (%) | [003]/[104] peak intensity ratio | Percent capacity maintenance (%) |
|---|---|---|---|---|
| Exp. Ex. 1-10 | 8 | 98 | 0.5 | 98 |
| Exp. Ex. 1-11 | 8 | 98 | 0.7 | 96 |
| Exp. Ex. 1-5 | 8 | 98 | 1.6 | 95 |

TABLE 4-continued

| | Voidage (%) | Open pore ratio (%) | [003]/[104] peak intensity ratio | Percent capacity maintenance (%) |
|---|---|---|---|---|
| Exp. Ex. 1-12 | 8 | 98 | 5 | 80 |
| Exp. Ex. 1-13 | 8 | 98 | 10 | 60 |

As is clear from Table 4, in Experiment Examples 1-5, 1-10, and 1-11, in which the peak intensity ratio [003]/[104] was 2 or lower, excellent cycle characteristic was attained. In contrast, in Experiment Examples 1-12 and 1-13, in which the peak intensity ratio [004]/[104] was in excess of 2, cycle characteristic was impaired, as compared with Experiment Examples 1-5, 1-10, and 1-11, in which the peak intensity ratio [004]/[104] was 2 or lower.

When the ceramic sheet of the embodiment for a cathode active material layer has a structure in which numerous primary particles (crystal particles) have been bound to one another (confirmed by the scanning electron microscopic images (photograph FIG. 4C) of the cross section, although the contrast is insufficient). Thus, in order to evaluate the influence of the primary particle size, there were produced ceramic sheet samples of Experiment Examples 1-14 to 1-17 having different primary particle sizes at a constant voidage and pore size. In Experiment Examples 1-14 to 1-17, the ceramic sheet samples having different primary particle sizes were formed by appropriately modifying conditions employed in incorporation of lithium (i.e., type and amount of lithium compound and treatment temperature, see Table 5), while the voidage and open pore ratio were maintained to the values employed in Experiment Example 1-5 (voidage: 8%, open pore ratio: 98%) by controlling the raw material particle size and firing temperature for yielding an intermediate fired product to the values employed in Experiment Example 1-5.

TABLE 5

| | Li compd. | Li/M mole ratio | Li incorporation temp. (° C.) |
|---|---|---|---|
| Exp. Ex. 1-14 | $Li_2O_2$ | 1 | 775 |
| Exp. Ex. 1-15 | $LiNO_3$ | 1 | 800 |
| Exp. Ex. 1-5 | $LiNO_3$ | 1.2 | 840 |
| Exp. Ex. 1-16 | $LiNO_3$ | 2 | 870 |
| Exp. Ex. 1-17 | $LiNO_3$ | 3 | 900 |

The primary particle size was determined through the following procedure. Specifically, a sample for observation under an electron microscope was prepared by thinning a ceramic sheet for a cathode active material layer to a thickness of about 80 nm through FIB (focused ion beam) working. The sample had a cross section in parallel with the plate surface of the ceramic sheet. The magnification of the transmission electron microscope was adjusted so that 10 or more primary particles were included in a vision field, and a bright image of the sample was taken. An inscribed circle was drawn in each of the 10 primary particles observed in the bright image, and the diameter of the inscribed circle was determined. The thus-obtained diameters were averaged, to thereby obtain a primary particle size. The evaluation results of Experiment Examples 1-14 to 1-17 are shown in Table 6.

TABLE 6

|  | Voidage (%) | Open pore ratio (%) | Primary particle size (μm) | Percent capacity maintenance (%) |
|---|---|---|---|---|
| Exp. Ex. 1-14 | 8 | 98 | 0.2 | 98 |
| Exp. Ex. 1-15 | 8 | 98 | 1.2 | 96 |
| Exp. Ex. 1-5 | 8 | 98 | 2 | 95 |
| Exp. Ex. 1-16 | 8 | 98 | 6 | 63 |
| Exp. Ex. 1-17 | 8 | 98 | 8 | 55 |

As is clear from Table 6, the ceramic sheet samples of Experiment Examples 1-5, 1-14, and 1-15, having a primary particle size of 5 μm or less, exhibited a favorable cycle characteristic. In contrast, the ceramic sheet sample of Experiment Examples 1-16 and 1-17, having a primary particle size in excess of 5 μm, exhibited an impaired cycle characteristic.

Example 2

Specific Example 2

Ni-Based Composition

In Experiment Examples 2-1 to 2-9, Li(Ni,Co,Al)$O_2$ ceramic sheets were produced under the conditions shown in Table 7.

TABLE 7

|  | Process | Material particle size (μm) | Calcining temp. (° C.) | Pore-forming material shape/amount (wt. parts) |
|---|---|---|---|---|
| Exp. Ex. 2-1 | 1 step |  |  | fibrous/5 |
| Exp. Ex. 2-2 | 2 step | 0.3 | 1,100 | 0 |
| Exp. Ex. 2-3 | 2 step | 0.3 | 1,100 | fibrous/5 |
| Exp. Ex. 2-4 | 2 step | 0.5 | 1,000 | 0 |
| Exp. Ex. 2-5 | 2 step | 1.0 | 1,000 | fibrous/5 |
| Exp. Ex. 2-6 | 1 step |  |  | fibrous/7.5 |
| Exp. Ex. 2-7 | 1 step |  |  | fibrous/12.5 |
| Exp. Ex. 2-8 | 1 step |  |  | fibrous/2.5 |
| Exp. Ex. 2-9 | 1 step |  |  | spherical/5 |

The detailed production conditions employed in Experiment Examples 2-2 and 2-4 shown in Table 7 are as follows (two-step process, no pore-forming material).

(1) Preparation of Slurry

NiO powder (particle size: 1 to 10 μm; product of Seido Kagaku Kogyo Co., Ltd.) (75.1 parts by weight), $Co_3O_4$ powder (particle size: 1 to 5 μm; product of Seido Kagaku Kogyo Co., Ltd.) (21.5 parts by weight), and $Al_2O_3$ powder (particle size: 1 to 10 μm; product of Showa Denko K.K.) (3.4 parts by weight) were mixed together and pulverized, and the resultant mixture was thermally treated in air at 1,000° C. for five hours, to thereby synthesize $(Ni_{0.75}, Co_{0.2}, Al_{0.05})O$ powder.

The thus-synthesized powder was pulverized by means of a pot mill, and the resultant $(Ni_{0.75}, Co_{0.2}, Al_{0.05})O$ raw material particles (100 parts by weight) were mixed with a dispersion medium (toluene:isopropanol=1:1) (100 parts by weight), a binder (polyvinyl butyral: product No. "BM-2," product of Sekisui Chemical Co. Ltd.) (10 parts by weight), a plasticizer (DOP: di(2-ethylhexyl)phthalate, product of Kurogane Kasei Co., Ltd.) (4 parts by weight), and a dispersant (trade name "RHEODOL SP-O30," product of Kao Corporation) (2 parts by weight). The resultant mixture was stirred under reduced pressure for defoaming, and the viscosity thereof was adjusted to 3,000 to 4,000 cP.

(2) Sheet Forming

The thus-prepared slurry was formed into a sheet-like compact on a PET film through the doctor blade method so that the thickness of the compact as measured after drying was adjusted to 30 μm.

(3) Calcination

The sheet-like compact was removed from the PET film and was cut into square pieces (50 mm×50 mm) by means of a cutter. Each piece was placed at the center of the aforementioned zirconia-made setter. The piece was heated in air at a specific temperature (firing temperature for yielding an intermediate fired product) for 10 hours. Thereafter, the atmosphere in the firing furnace was replaced with an oxygen atmosphere, followed by cooling to room temperature at 200 degrees (° C.)/h. Then, a portion of the piece which was not fused to the setter was removed from the furnace.

(4) Lithium Incorporation

LiOH powder (product of Kanto Chemical Co., Inc.) was applied to the thus-obtained $(Ni_{0.75}, Co_{0.2}, Al_{0.05})O$ ceramic sheet so that the ratio by mole of Li/(NiCoAl) was 3.0, and the mixture was thermally treated in an oxygen atmosphere (0.1 MPa) at 775° C. for 48 hours, to thereby produce an "independent" $Li_{1.0}(Ni_{0.75}, Co_{0.2}, Al_{0.05})O_2$ ceramic sheet for a cathode active material layer.

The detailed production conditions employed in Experiment Examples 2-3 and 2-5 shown in Table 7 were the same as those employed in other Experiment Examples (e.g., 2-2), except that the aforementioned pore-forming material was added (two-step process, no pore-forming material). The detailed production conditions employed in Experiment Examples 2-1 and 2-6 to 2-9 shown in Table 7 are as follows (one-step process).

(1) Preparation of Slurry

NiO powder (particle size: 1 to 10 μm; product of Seido Kagaku Kogyo Co., Ltd.), $Co_3O_4$ powder (particle size: 1 to 5 μm; product of Seido Kagaku Kogyo Co., Ltd.), $Al_2O_3 \cdot H_2O$ (particle size: 1 to 3 μm; product of SASOL), and $Li_2CO_3$ powder (particle size: 10 to 50 μm; product of Kanto Chemical Co., Inc.) were mixed at predetermined proportions so as to attain a composition of $Li_{1.50}(Ni_{0.75}Co_{0.2}Al_{0.05})O_2$. From the thus-prepared material powder (100 parts by weight) and the aforementioned pore-forming material, a slurry was prepared through the same procedure as employed in the aforementioned Experiment Examples (viscosity of slurry: 500 to 700 cP).

(2) Sheet Forming

The thus-prepared slurry was formed into a sheet-like compact on a PET film through the doctor blade method so that the thickness of the compact as measured after drying was adjusted to 30 μm.

(3) Thermal Treatment

The sheet was removed from the PET film and was cut into square pieces (70 mm×70 mm) by means of a cutter. Each piece was placed at the center of the aforementioned zirconia-made setter. The piece was heated in an oxygen atmosphere (oxygen partial pressure: 0.1 MPa) at 750° C. for 5 hours, to thereby produce an "independent" $Li_{1.0}(Ni_{0.75}Co_{0.2}Al_{0.05})O_2$ ceramic sheet having a thickness of 30 μm for a cathode active material layer.

The ceramic sheets of the Experiment Examples shown in Table 7 were evaluated, and the results are shown in Table 8. As is clear from Table 8, the ceramic sheets having a nickel-based composition were found to have the same characteristics as those of the ceramic sheets having a cobalt-based composition.

TABLE 8

|  | Voidage (%) | Open pore ratio (%) | Primary particle size (μm) | Percent capacity maintenance (%) |
| --- | --- | --- | --- | --- |
| Exp. Ex. 2-1 | 3.2 | 70 | 0.5 | 88 |
| Exp. Ex. 2-2 | 3 | 80 | 0.3 | 91 |
| Exp. Ex. 2-3 | 3.1 | 95 | 0.2 | 93 |
| Exp. Ex. 2-4 | 8 | 80 | 0.8 | 88 |
| Exp. Ex. 2-5 | 7.8 | 98 | 0.9 | 93 |
| Exp. Ex. 2-6 | 9.2 | 70 | 1.6 | 87 |
| Exp. Ex. 2-7 | 29.5 | 70 | 2.2 | 91 |
| Exp. Ex. 2-8 | 2.5 | 70 | 1.7 | 40 |
| Exp. Ex. 2-9 | 3 | 60 | 2.2 | 52 |

Similar to the aforementioned $LiCoO_2$ sheets, lithium oxide ceramic sheets of a nickel-based composition were evaluated in terms of peak intensity ratio [003]/[104] and effect of primary particle size. The results are shown in Tables 9 to 12. As is clear from Tables 9 to 12, the ceramic sheets having a nickel-based composition were found to have the same characteristics as those of the aforementioned $LiCoO_2$ sheets.

TABLE 9

|  | Li compd. | Li/M mole ratio | Li incorporation temp. (° C.) |
| --- | --- | --- | --- |
| Exp. Ex. 2-10 | $Li_2O_2$ | 2 | 750 |
| Exp. Ex. 2-11 | $Li_2O_2$ | 3 | 750 |
| Exp. Ex. 2-5 | LiOH | 3 | 775 |
| Exp. Ex. 2-12 | LiOH | 5 | 800 |
| Exp. Ex. 2-13 | LiOH | 10 | 800 |

TABLE 10

|  | Voidage (%) | Open pore ratio (%) | [003]/[104] peak intensity ratio | Percent capacity maintenance (%) |
| --- | --- | --- | --- | --- |
| Exp. Ex. 2-10 | 7.8 | 98 | 0.3 | 97 |
| Exp. Ex. 2-11 | 7.8 | 98 | 0.7 | 95 |
| Exp. Ex. 2-5 | 7.8 | 98 | 1.4 | 93 |
| Exp. Ex. 2-12 | 7.8 | 98 | 6 | 80 |
| Exp. Ex. 2-13 | 7.8 | 98 | 9 | 60 |

TABLE 11

|  | Li compd. | Li/M mole ratio | Li incorporation temp. (° C.) |
| --- | --- | --- | --- |
| Exp. Ex. 2-14 | $Li_2O_2$ | 2 | 750 |
| Exp. Ex. 2-15 | $Li_2O_2$ | 3 | 750 |
| Exp. Ex. 2-5 | LiOH | 3 | 775 |
| Exp. Ex. 2-16 | LiOH | 5 | 800 |
| Exp. Ex. 2-17 | LiOH | 10 | 800 |

TABLE 12

|  | Voidage (%) | Open pore ratio (%) | Primary particle size (μm) | Percent capacity maintenance (%) |
| --- | --- | --- | --- | --- |
| Exp. Ex. 2-14 | 7.8 | 98 | 0.1 | 97 |
| Exp. Ex. 2-15 | 7.8 | 98 | 0.5 | 96 |
| Exp. Ex. 2-5 | 7.8 | 98 | 0.9 | 93 |
| Exp. Ex. 2-16 | 7.8 | 98 | 3 | 63 |
| Exp. Ex. 2-17 | 7.8 | 98 | 6 | 55 |

Examples of Modifications

The above-described embodiment and specific examples are, as mentioned above, mere examples of the best mode of the present invention which the applicant of the present invention contemplated at the time of filing the present application. The above-described embodiment and specific examples should not be construed as limiting the invention. Various modifications to the above-described embodiment and specific examples are possible, so long as the invention is not modified in essence.

Several modifications will next be exemplified. In the following description of the modifications, component members similar in structure and function to those of the above-described embodiment are denoted by names and reference numerals similar to those of the above-described embodiment. The description of the component members appearing in the above description of the embodiment can be applied as appropriate, so long as no inconsistencies are involved.

Needless to say, even modifications are not limited to those described below. Limitingly construing the present invention based on the above-described embodiment and the following modifications impairs the interests of an applicant (particularly, an applicant who is motivated to file as quickly as possible under the first-to-file system) while unfairly benefiting imitators, and is thus impermissible.

The structure of the above-described embodiment and the structures of the modifications to be described below are entirely or partially applicable in appropriate combination, so long as no technical inconsistencies are involved.

The present invention is not limited to the constitution which is specifically disclosed in the description of the above embodiments. For example, the cathode collector 15a of the cathode 15 may be omitted. That is, the sintered lithium composite oxide sheet as is may be employed as the cathode 15.

Figure 6:
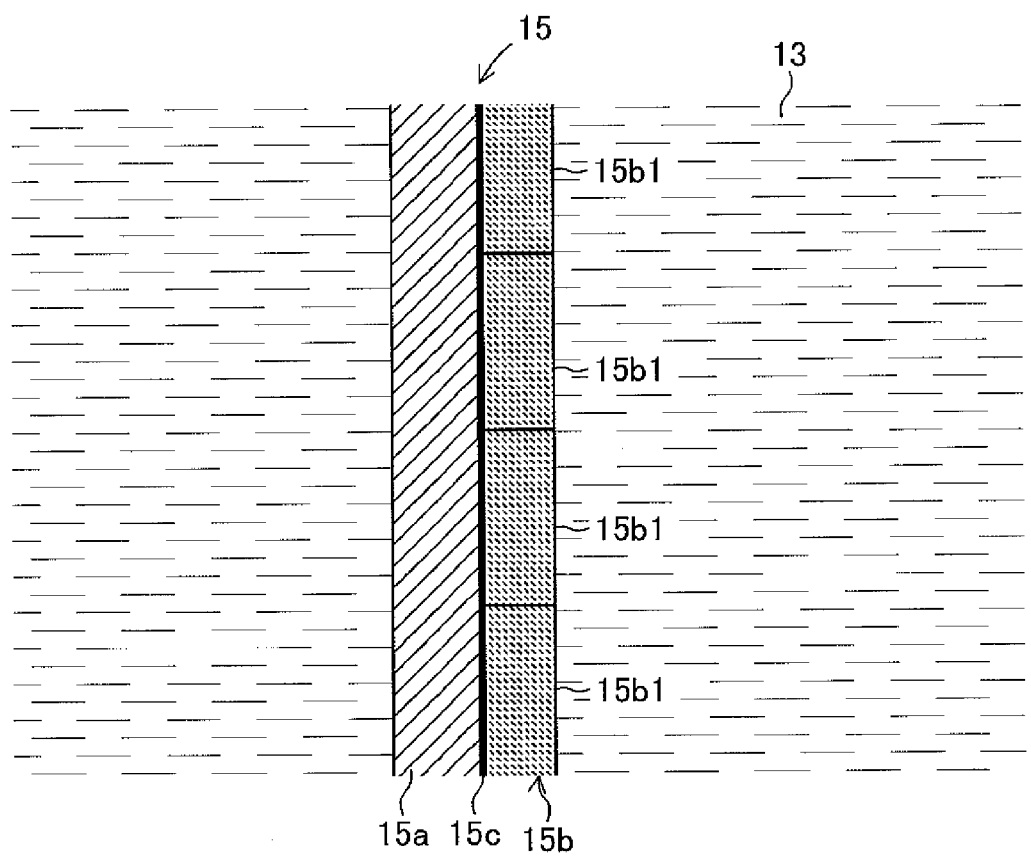
FIG. 6 is a side sectional view of the configuration of a modification of the cathode shown in FIG. 1B.

FIG. 6 is a side sectional view of the configuration of a modification of the cathode 15 shown in FIG. 1B. As shown in FIG. 6, in one exemplary mode, a plurality of sintered lithium composite oxide sheets 15b1 are bonded to the cathode collector 15a, while the sheets are one-dimensionally or two dimensionally arranged, to thereby form the cathode 15. In this case, the cathode active material layer 15b is formed of a plurality of sintered lithium composite oxide sheets 15b1 which are arranged one-dimensionally or two-dimensionally.

In the configuration shown in FIG. 6, each sintered lithium composite oxide sheet 15b1 may be obtained through cutting an edge of the aforementioned lithium-incorporated sintered sheet to predetermined dimensions as viewed from the top plane. Alternatively, each sintered lithium composite oxide sheet 15b1 may be obtained through one-dimensionally or two-dimensionally dividing the aforementioned lithium-incorporated sintered sheet into pieces as viewed from the top plane. In either case, preferably, the cathode 15 is formed such that one sintered lithium composite oxide sheet 15b1 is closely bonded to another adjacent sheet so as to reduce the space between two sintered lithium composite oxide sheets 15b1 adjacent to each other, and such that the sintered sheets are bonded to the cathode collector 15a so as to prevent intrusion of the conductive bonding layer 15c into the spaces, whereby the electrolyte 13 enters the very narrow spaces between two adjacent sintered lithium composite oxide sheets 15b1.

Figure 7:
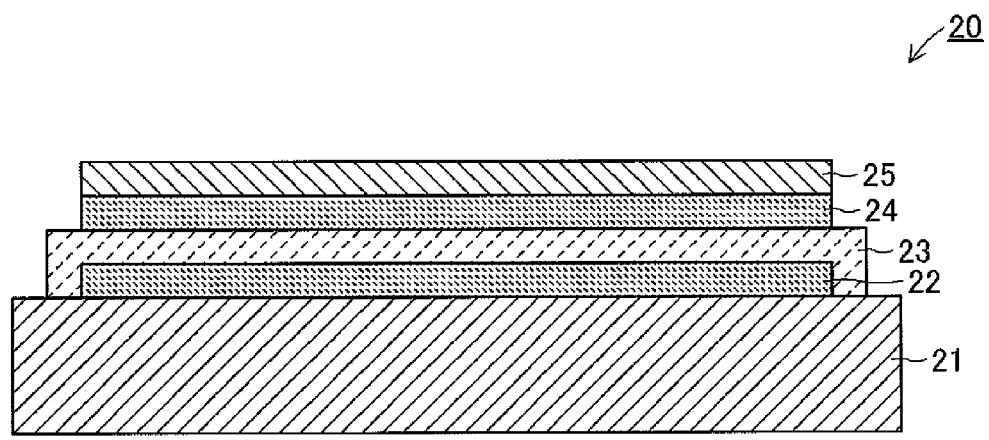
FIG. 7 is a sectional view of the schematic configuration of another embodiment of the lithium secondary battery of the present invention.

FIG. 7 is a sectional view of the schematic configuration of an embodiment of the lithium secondary battery 20 of the present invention. As shown in FIG. 7, the lithium secondary battery 20 is of a so-called complete solid type and has a cathode collector 21, a cathode active material layer 22, a solid electrolyte layer 23, an anode active material layer 24, and an anode collector 25. The lithium secondary battery 20 is formed by stacking, on the cathode collector 21, the cathode active material layer 22, the solid electrolyte layer 23, the anode active material layer 24, and the anode collector 25, in this order. The sintered lithium composite oxide sheet of the present invention preferably formed the cathode active material layer 22 of the aforementioned secondary battery. In this case, preferably, the open pores of the cathode active material layer 22 are continuously filled with the solid electrolyte 23, from the viewpoint of activation of intercalation/deintercalation of lithium ions to/from the cathode active material.

Figure 8:
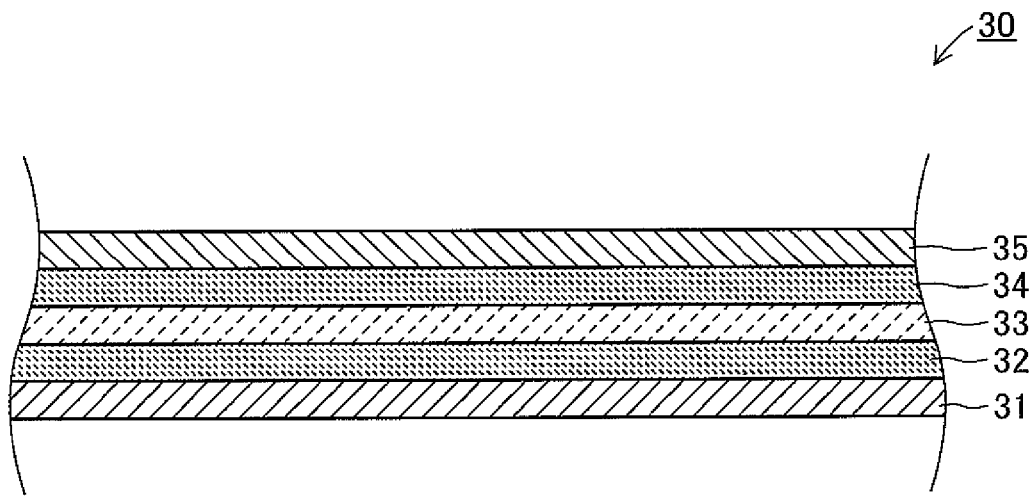
FIG. 8 is a sectional view of the schematic configuration of another embodiment of the lithium secondary battery of the present invention.

FIG. 8 is a sectional view of the schematic configuration of an embodiment of the lithium secondary battery 30 of the present invention. As shown in FIG. 8, the lithium secondary battery 30 is of a so-called polymer type and has a cathode collector 31, a cathode active material layer 32, a polymer electrolyte layer 33, an anode active material layer 34, and an anode collector 35. The lithium secondary battery 30 is formed by stacking, on the cathode collector 31, the cathode active material layer 32, the polymer electrolyte layer 33, the anode active material layer 34, and the anode collector 35, in this order. The sintered lithium composite oxide sheet of the present invention preferably formed the cathode active material layer 32 of the aforementioned secondary battery.

As shown in FIG. 1B, the cathode collector 15a may be disposed on at least one of the two plate surfaces of the cathode active material layer 15b. Alternatively, as shown in FIG. 9, the cathode collector 15a may be disposed on each of the two plate surfaces of the cathode active material layer 15b.

Figure 9:
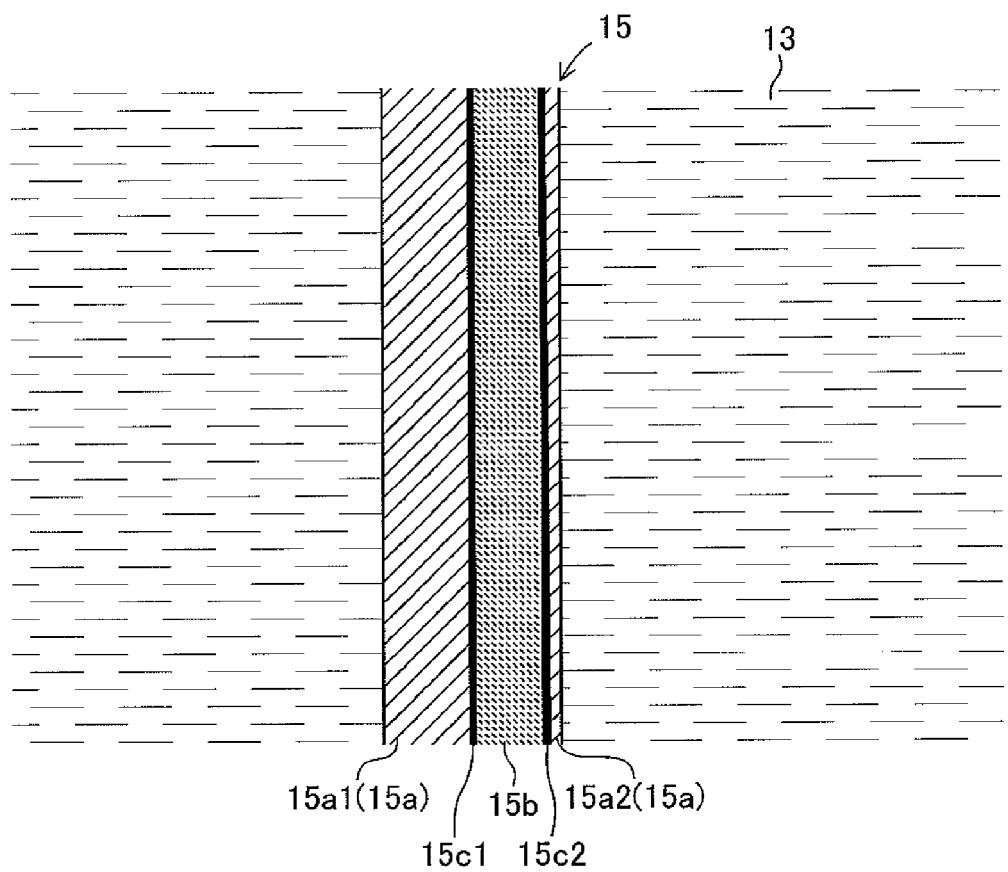
FIG. 9 is a sectional view of the configuration of another modification of the cathode shown in FIG. 1B.

As shown in FIG. 9, in the case where the cathode collector 15a is disposed on each plate surface of the cathode active material layer 15b, one cathode collector 15a1 may have a thickness greater than the other cathode collector 15a2 so as to sustain the cathode active material layer 15b. In this case, the counter cathode collector disposed 15a2 may have such a structure as not inhibit intercalation/deintercalation of lithium ions into/from the cathode active material layer 15b (e.g., a mesh-like structure or a porous structure). The cathode collector 15a2 may also be applicable to the cathode 15 shown in FIG. 1B.

Moreover, a conductive bonding layer 15c1 disposed on the side of the cathode collector 15a1 and a conductive bonding layer 15c2 disposed on the side of the cathode collector 15a2 may have thicknesses identical to or different from each other. The two conductive bonding layers may be formed of the same material or different materials. Furthermore, one of the two conductive layers may be omitted. In other words, the cathode collector 15a1 or the cathode collector 15a2 may be formed directly on a plate surface of the cathode active material layer 15b through a process such as coating or sputtering.

As shown in FIG. 1B, in the case where the cathode collector 15a is disposed on only one plate surface of the cathode active material layer 15b, lithium ions and electrons move in the directions opposite to each other in the cell reaction occurring at the cathode 15 during the charge-discharge process, whereby potential gradient is generated in the cathode active material layer 15b. When a large potential gradient is generated, diffusion of lithium ions is impeded.

In contrast, as shown in FIG. 9, the aforementioned generation of potential gradient is suppressed through formation of a cathode collector 15a2 which does not inhibit intercalation/deintercalation of lithium ions, on the side of the cathode active material layer 15b in contact with the electrolyte 13, leading to enhancement of battery performance.

The ratio by mole of lithium to M; i.e., Li/M (Li/Co or Li/(Co,Ni,Mn)) of a sintered sheet represented by formula $Li_xMO_2$ is not limited to 1.0. However, the ratio is preferably 0.9 to 1.2, more preferably 1.0 to 1.1. Through controlling the ratio, excellent charge-discharge capacity is attained.

Needless to say, those modifications which are not particularly referred to are also encompassed in the technical scope of the present invention, so long as the invention is not modified in essence.

Those components which partially constitute means for solving the problems to be solved by the present invention and are illustrated with respect to operations and functions encompass not only the specific structures disclosed above in the description of the above embodiment and modifications but also any other structures that can implement the operations and functions. Further, the contents (including specifications and drawings) of the prior application and publications cited herein can be incorporated herein as appropriate by reference.

What is claimed is:

1. A lithium secondary battery cathode comprising:
    a cathode collector formed of a conductive substance, and
    a cathode active material layer which is formed of a sintered lithium composite oxide sheet having a thickness of 30 µm or more, a voidage of 3 to 30%, and an open pore ratio of 70% or higher, and which is bonded to the cathode collector by the mediation of a conductive bonding layer,
    wherein the sintered lithium composite oxide sheet has a layered rock salt structure,
    wherein the sintered lithium composite oxide sheet exhibits a ratio of intensity of X-ray diffraction by the (003) plane to intensity of X-ray diffraction by the (104) plane, [003]/[104], of 2 or less,
    wherein the intensity of X-ray diffraction is attained by measuring an X-ray diffraction profile of the surface of the sintered lithium composite oxide sheet, and
    wherein the (104) plane is oriented in a direction parallel to the surface of the sintered lithium composite oxide sheet.

2. The lithium secondary battery cathode according to claim 1, wherein the sintered lithium composite oxide sheet has a ratio w/t of 3 or more, wherein t represents the thickness of the sheet, and w represents the minimum size of the sheet as measured in a direction orthogonal to the thickness direction which defines the thickness t.

3. The lithium secondary battery cathode according to claim 1, wherein the sintered lithium composite oxide sheet has a structure in which numerous primary particles have been bound to one another, and the primary particles have a primary particle size of 5 µm or less.

4. A lithium secondary battery comprising at least the following:
    a cathode having a cathode active material layer which is formed of a sintered lithium composite oxide sheet having a thickness of 30 µm or more, a voidage of 3 to 30%, and an open pore ratio of 70% or higher, and a cathode collector bonded to the cathode active material layer by the mediation of a conductive bonding layer;

wherein the sintered lithium composite oxide sheet has a layered rock salt structure, an anode containing as an anode active material a carbonaceous material or a lithium-occluding substance; and an electrolyte disposed so as to intervene between the cathode and the anode, wherein the sintered lithium composite oxide sheet exhibits a ratio of intensity of X-ray diffraction by the (003) plane to intensity of X-ray diffraction by the (104) plane, [003]/[104], of 2 or less, wherein the intensity of X-ray diffraction is attained by measuring an X-ray diffraction profile of the Mate surface of the sintered lithium composite oxide sheet, and wherein the (104) plane is oriented in a direction parallel to the surface of the sintered lithium composite oxide sheet.

5. The lithium secondary battery according to claim 4, wherein the sintered lithium composite oxide sheet has a ratio w/t of 3 or more, wherein t represents the thickness of the sheet, and w represents the minimum size of the sheet as measured in a direction orthogonal to the thickness direction which defines the thickness t.

6. The lithium secondary battery according to claim 4, wherein the sintered lithium composite oxide sheet has a structure in which numerous primary particles have been bound to one another, and the primary particles have a primary particle size of 5 μm or less.

7. The lithium secondary battery cathode according to claim 1, wherein the [003]/[104] intensity ratio is 1.4 or less.

8. The lithium secondary battery cathode according to claim 4, wherein the [003]/[104] intensity ratio is 1.4 or less.

* * * * *